United States Patent [19]

Itoh et al.

[11] 4,022,747
[45] May 10, 1977

[54] SILICONE RUBBER COMPOSITIONS

[75] Inventors: Kunio Itoh; Naoyoshi Kuga; Takeshi Fukuda, all of Annaka, Japan

[73] Assignee: Shin-Etsu Chemical Company Limited, Tokyo, Japan

[22] Filed: Oct. 28, 1975

[21] Appl. No.: 626,350

[30] Foreign Application Priority Data

Oct. 28, 1974 Japan .......................... 49-124095

[52] U.S. Cl. ..................... 260/37 SB; 260/29.1 SB
[51] Int. Cl.$^2$ ........................................ C08L 83/04
[58] Field of Search ................ 260/37 SB, 29.1 SB

[56] References Cited

UNITED STATES PATENTS

| | | | |
|---|---|---|---|
| 2,819,236 | 1/1958 | Dickmann | 260/29.1 SB |
| 3,234,174 | 2/1966 | Williams | 260/37 SB |
| 3,234,175 | 2/1966 | Pike | 260/29.1 SB X |
| 3,671,546 | 6/1972 | Karstedt et al. | 260/37 SB |

*Primary Examiner*—Lewis T. Jacobs
*Attorney, Agent, or Firm*—Toren, McGeady and Stanger

[57] ABSTRACT

Silicone rubber compositions comprising (*a*) diorganopolysiloxane with a viscosity at least 1,000,000 centistokes at 25° C, of which from 8 to 80 mole % of the organic groups are monovalent hydrocarbon group having from 2 to 4 carbon atoms, (*b*) an organopolysiloxane with a viscosity at most 200 centistokes, (*c*) a silica filler, and (*d*) an organic peroxide. Their vulcanized form, i.e., silicone rubber elastomers exhibit a high degree of elasticity in an extremely low temperature range, and have superior properties with respect to heat-resistance, oil-resistance, electrical characteristics and compression set.

14 Claims, No Drawings

SILICONE RUBBER COMPOSITIONS

FIELD OF THE INVENTION

This invention relates to novel silicone rubber compositions which, when vulcanized by heating, form rubbery elastomers that exhibit superior elasticity in an extremely low temperature range.

FIELD OF THE PRIOR ART

Conventional silicone rubber compositions are composed mainly of a methylphenylpolysiloxane of which from 3 to 15 mole % of the siloxane units are methylphenylsiloxane units, the remainder being demethhylsiloxane units. (See U.S. Pat. No. 2,560,498.) These silicone rubber compositions are disadvantaged by poor processability in milling on rollers as well as low vulcanizability, and elastomers obtained by vulcanizing them have inferrior heat-resistance, oil resistance and compression set.

Another well-known example of silicone rubber compositions is what is composed mainly of an organopolysiloxane, containing 3-trifluoropropyl groups. Although the silicone rubber elastomer formed of this example has superior oil resistance, its elasticity in a low temperature range is not always satisfactory, while its production cost is too high to meet commercial requirement.

OBJECTS OF THE INVENTION

It is therefore a general object of this invention to provide novel silicone rubber compositions capable of forming silicone rubber elastomers that are free of the above-described drawbacks.

SUMMARY OF THE INVENTION

The silicone rubber composition of this invention comprises:

a. 100 parts by weight of a diorganopolysiloxane having a viscosity of at least 1,000,000 centistokes at 25° C, represented by the average formula

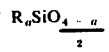  (I)

where R is an organic group, from 20 to 90 mole % of the groups represented by R being methyl groups, from 8 to 80 mole % of same being substituted or unsubstituted monovalent hydrocarbon groups having from 2 to 4 carbon atoms, and from 0 to 7 mole % of same being substituted or unsubstituted aromatic monovalent hydrocarbon groups having from 6 to 9 carbon atoms, and $a$ is a number from 1.98 inclusive to 2.02 inclusive, b. from 1 to 20 parts by weight of an organopolysiloxane having a viscosity of at most 200 centistokes at 25° C, represented by the average formula

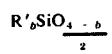  (II)

where R' is a substituted or unsubstituted monovalent hydrocarbon group and $b$ is a number from 1.98 inclusive to 3 inclusive, c. from 20 to 100 parts by weight of a silica filler, and d. from 0.5 to 5 parts by weight of an organic peroxide.

DETAILED DESCRIPTION OF THE INVENTION

The compositions comprising the above components (a), (b), (c) and (d) possess excellent processability, and silicone rubber elastomers prepared by vulcanizing them exhibit a high degree of elasticity even in a low temperature range as well as superior heat-resistance, oil resistance, electrical properties and compression set.

The diorganopolysiloxane being component (a) useful in the composition of this invention is represented by the above-mentioned average formula (I) where R is an organic group, such as, methyl, ethyl, propyl, butyl, vinyl, phenyl, benzyl, 1-phenylethyl, 2-phenylethyl or 2-phenylpropyl group, and $a$ is a number from 1.98 inclusive to 2.02 inclusive. Of these organic groups, from 20 to 90 mole %, preferably from 60 to 90 mole %, must be methyl groups, from 8 to 80 mole %, preferably from 8 to 40 mole %, must be monovalent hydrocarbon groups having from 2 to 4 carbon atoms, such as, ethyl, propyl, butyl, vinyl and allyl groups, and from 0 to 7 mole % must be substituted or unsubstituted aromatic monovalent hydrocarbon groups having from 6 to 9 carbon atoms, such as, phenyl, benzyl, 2-phenylethyl, 2-phenylpropyl, 1-phenylethyl, tolyl, xylyl or styryl groups. Further, the viscosity of component (a) is at least about 1,000,000 centistokes at 25° C, or preferably between 2,000,000 centistokes and 8,000,000 centistokes at 25° C.

The diorganopolysiloxane as component (a) in the composition of this invention may be a compound composed of dimethylsiloxane, methylethylsiloxane and methylvinylsiloxane units; one composed of dimethylsiloxane, methylpropylsiloxane and methylvinylsiloxane units; and one composed of dimethylsiloxane, methylethylsiloxane and 2-phenylpropylethylsiloxane units.

The diorganopolysiloxane is composed of diorganosiloxane units combined in a straight chain, each of which units has two same or different organic groups bonded to the silicon atom. There is no particular requirement for the order by which the units are combined. For example, the various units may combine in a random order to give the socalled random copolymers, or several of the same units may combine in an uninterrupted sequence to give the socalled block copolymers. The random copolymers are preferred to form elastomer products having superior elasticity even in a low temperature range, while the block copolymers are preferred to form elastomers superior in processability and compression set.

The organopolysiloxane being component (b) useful in the composition of this invention is represented by the above-mentioned average formula (II) where R' is an unsubstituted monovalent hydrocarbon group, such as, methyl, ethyl, propyl, vinyl, phenyl or benzyl group, or a halogen-substituted group thereof, and $b$ is a number from 1.98 inclusive to 3 inclusive. It is required that the organopolysiloxane as component (b) in the composition of this invention has a viscosity of at the most 200 centistokes at 25° C, for any viscosities exceeding 200 centistokes will give worsened processability in milling on rollers and also poor plasticity to the resulting compositions.

The organopolysiloxanes are preferably trimethylsilyl-terminated linear organopolysiloxanes exemplified by the following.

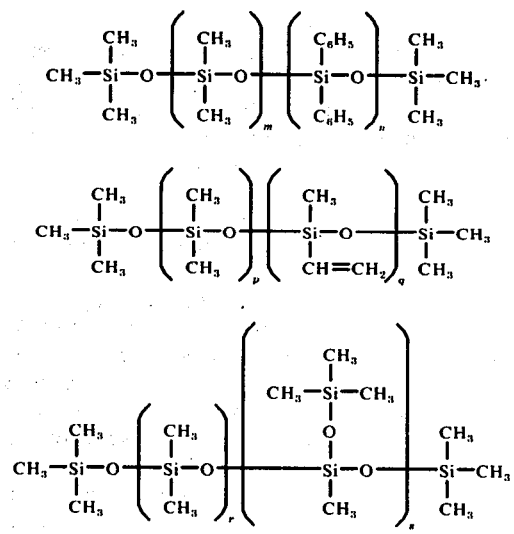

In the formulas above, $m$, $n$, $p$, $q$, $r$ and $s$ are each positive integers selected so that the viscosity of each organopolysiloxane is at the most 200 centistokes at 25° C. For example, $m \leqq 30$, $n \leqq 5$, $p \leqq 40$, $q \leqq 10$, $r \leqq 40$, $s \leqq 10$.

The amount of component (b) to be added to 100 parts by weight of component (a) should be in the range of from 1 to 20 parts by weight, preferably from 5 to 15 parts by weight. If it is lower than the range, no object of this invention can be attained and if, on the other hand, it is larger than the range, the resulting compositions will exhibit stickiness or become too soft to be kneaded with ease, and the rubbery elastomer products prepared therefrom will have their physical properties adversely affected.

The silica filler as component (c) useful in the compositions of this invention works to impart mechanical strengths to silicone rubber elastomers prepared from the compositions. It has, preferably, an average particle size of 10 μm at the most. Its examples are silica aerogel, quartz powder and diatomaceous earth. A preferable one is a silica aerogel having a specific surface area larger than 50 m²/g. The amount of the silica filler to be used in the composition of this invention is from 20 to 100 parts by weight based on 100 parts by weight of component (a).

In order to have the filler uniformly dispersed in the composition of the invention, a silane or an organopolysiloxane of a low molecular weight having one or more of hydroxy or alkoxy groups bonded to the silicon atom or atoms, or an organic plasticizer may be added to the filler with thermal treatment, if necessary, before use.

The organic peroxide being component (d) useful in the compositions of this invention is a vulcanizing agent. Its examples are dibenzoyl peroxide, bis(2,4-dichlorobenzoyl) peroxide, dicumyl peroxide and ditertiarybutyl peroxide. To 100 parts by weight of component (a) is added from 0.5 to 5 parts by weight of component (d). If the amount of component (d) is smaller than 0.5 part by weight, no good vulcanization can be expected while, if it is larger than 5 parts by weight, the silicone rubber elastomers prepared will become to have an excessively crosslinked structure, resulting in the deterioration of elongation and other physical properties.

The compositions of the invention is obtained by kneading the mixture of the above-described components (a), (b), (c) and (d) on a roller mill or a kneader. The compositions thus prepared are heated at 100°–200° C for 10–30 minutes, to become vulcanized and converted to rubbery elastomers having superior physical properties even at low temperatures.

The compositions of this invention may include any additives, such as, pigments and dyes, that have conventionally been used in the preparation of silicone rubber elastomers, insofar as the objects of this invention will not be adversely affected.

The following examples illustrate this invention. In the examples, parts are all parts by weight and, as the physical properties of silicone rubber elastomers, hardness, tensile strength, elongation and compression set are what were determined in accordance with JIS C 2123 with the respective elastomers having been heated at 150° C for 18 hours, and low temperature property is expressed in the Gehman transition point determined in accordance with ASTM D 1053.

EXAMPLE 1.

100 parts of a diorganopolysiloxane having a viscosity 5,000,000 centistokes at 25° C, terminated at both chain ends with trimethylsilyl groups and composed of randomly linked diorganosiloxane units, of which 59.8 mole %, 40.0 mole % and 0.2 mole % are dimethylsiloxane units, methylethylsiloxane units and methylvinylsiloxane units, respectively, 10 parts of a methylphenylpolysiloxane having a viscosity of 50 centistokes at 25° C expressed by the formula

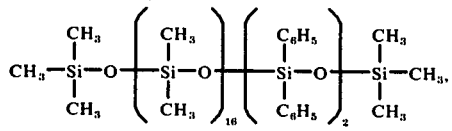

40 parts of Aerosil 200 product of DEGUSSA and 4 parts of diphenylsilanediol were kneaded by a kneader at 150° C for 2 hours. The resulting mixture was cooled, and after further kneading with addition of 2 parts of dicumyl peroxide, the mixture was put into a mold and heated at 160° C for 10 minutes so as to be vulcanized. The processability of the composition was found satisfactory. The silicone rubber elastomer thus prepared proved to have the following properties.

| Hardness | 50 |
|---|---|
| Tensile strength | 90 kg/cm² |
| Elongation | 450% |
| Compression set | 25% |
| Low temperature property | −130° C |

EXAMPLE 2.

The same procedure as in Example 1 was repeated exceptionally with a diorganopolysiloxane having the same viscosity and terminal groups but the randomly linked diorganosiloxane units consisting of 69.8 mole % of dimethylsiloxane units, 30 mole % of propylmethylsiloxane units, and 0.2 mole % of methylvinylsiloxane units. The composition was found to have satisfactory processability, while the silicone rubber elastomer prepared had the following properties.

| Hardness | 51 |
|---|---|
| Tensile strength | 95 kg/cm$^2$ |
| Elongation | 400% |
| Compression set | 25% |
| Low temperature property | −125° C |

EXAMPLE 3.

100 parts of a diorganopolysiloxane having a viscosity of 6,000,000 centistokes at 25° C, terminated with trimethylsilyl groups at both chain ends and composed of randomly linked diorganosiloxane units consisting of 75 mole % of dimethylsiloxane units, 20 mole % of methylethylsiloxane units and 5 mole % of methylisobutylsiloxane units, 10 parts of a siloxane having a viscosity of 30 centistokes at 25° C and represented by the formula

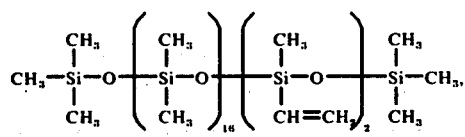

40 parts of Aerosil R972 (product of DEGUSSA) and 4 parts of dimethyldimethoxy silane were thoroughly mixed and kneaded by a roller mill. With addition of 1 part of benzoylperoxide, the mixture was vulcanized by heating at 120° C for 10 minutes, and subsequently at 200° C for 4 hours. The composition had a satisfactory processability, while the silicone rubber elastomer formed had the following properties.

| Hardness | 50 |
|---|---|
| Tensile strength | 90 kg/cm$^2$ |
| Elongation | 450% |
| Compression set | 35% |
| Low temperature property | −135° C |

EXAMPLE 4.

The same procedure as in Example 3 was repeated exceptionally with a diorganopolysiloxane having the same viscosity and terminal groups but the randomly linked diorganosiloxane units consisting of 75 mole % of dimethylsiloxane units, 20 mole % of methylvinylsiloxane units and 5 mole % of phenylethylmethylsiloxane units and also exceptionally with a siloxane having the same viscosity but represented by the following formula.

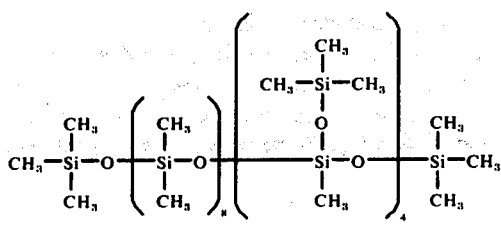

The composition obtained above was found to have a satisfactory processability, while the silicone rubber elastomer formed had the following properties.

| Hardness | 54 |
|---|---|
| Tensile strength | 95 kg/cm$^2$ |
| Elongation | 380% |
| Compression set | 20% |
| Low temperature property | −130° C |

EXAMPLE 5.

The formulation and the procedure were the same as in Example 1 except that component (a) employed here was a diorganopolysiloxane having a viscosity of 5,000,000 centistokes at 25° C and having a block structure. This diorganopolysiloxane had been prepared by the condensation reaction, in the presence of phosphonitrile chloride, of (i) a dimethylpolysiloxane fluid having a viscosity of 1,000 centistokes at 25° C, terminated at both chain ends with hydroxy groups, (ii) a methylethylpolysiloxane fluid having a viscosity of 1,000 centistokes at 25° C, terminated at both chain ends with hydroxy groups and (iii) a methylvinylpolysiloxane fluid having a viscosity of 100 centistokes at 25° C, terminated at both chain ends with hydroxy groups, in a molar ratio of 59.8%, 40.0% and 0.2%, respectively, relative to the number of the siloxane units in the individual diorganopolysiloxanes. The silicone rubber composition obtained exhibited a satisfactory processability, while the elastomer prepared had the following properties.

| Hardness | 50 |
|---|---|
| Tensile strength | 90 kg/cm$^2$ |
| Elongation | 450% |
| Compression set | 30% |
| Low temperature property | −75° C |

EXAMPLE 6.

This is a control example in which the use of component b) was omitted.

100 parts of a diorganopolysiloxane having a viscosity of 5,000,000 centistokes at 25° C, terminated with trimethylsilyl groups at both chain ends and composed randomly linked diorganosiloxane units consisting of 59.8 mole % of dimethylsiloxane units, 40 mole % of methylethylsiloxane units and 0.2 mole % of methylvinylsiloxane units, 40 parts of Aerosil 200 (product of DEGUSSA) and 4 parts of diphenylsilanediol were mixed and kneaded by a kneader at 150° C for 2 hours. Subsequently, the resulting mixture was cooled, and 2 parts of dicumylperoxide was added to prepare a composition. This composition was put into a mold and headed at 160° C for 10 minutes for vulcanization. The processability of the composition was found poor, while the elastomer formed proved to have the following properties.

| Hardness | 49 |
|---|---|
| Tensile strength | 95 kg/cm$^2$ |
| Elongation | 500% |
| Compression set | 75% |
| Low temperature properties | −105° C |

What is claimed is:
1. A silicone rubber composition consisting essentially of (a) 100 parts by weight of a diorganopolysilox- ane having a viscosity of at least 1,000,000 centistokes at 25° C, represented by the average formula

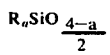

where R is an organic group, from 20 to 90 mole % of the groups represented by R being methyl groups, from 8 to 80 mole % of same being substituted or unsubstituted monovalent hydrocarbon groups having from 2 to 4 carbon atoms, and from 0 to 7 mole % of same being substituted or unsubstituted aromatic monovalent hydrocarbon groups having from 6 to 9 carbon atoms, and a is a number from 1.98 inclusive to 2.02 inclusive, (b) from 1 to 20 parts by weight of a trimethylsilylterminated linear organopolysiloxane having a viscosity of at most 200 centistokes at 25° C, represented by the average formula

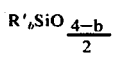

where R' is a substituted or unsubstituted monovalent hydrocarbon group and b is a number of 1.98 inclusive to 3 inclusive, (c) from 20 to 100 parts by weight of a silica filler, and (d) from 0.5 to 5 parts by weight of an organic peroxide.

2. The composition as claimed in claim 1 wherein said organic group represented by symbol R consists of 60 to 90 mole % being methyl groups, from 8 to 40 mole % being substituted or unsubstituted monovalent hydrocarbon groups having from 2 to 4 carbon atoms, and from 0 to 7 mole % being phenyl groups.

3. The composition as claimed in claim 1 wherein said substituted or unsubstituted monovalent hydrocarbon group in component (a) is selected from the class consisting of ethyl, propyl, butyl and vinyl groups.

4. The composition as claimed in claim 1 wherein said substituted or unsubstituted aromatic monovalent hydrocarbon group in component (a) is a phenyl group.

5. The composition as claimed in claim 1 wherein said component (a) has a structure of random copolymer.

6. The composition as claimed in claim 1 wherein said component (a) has a structure of block copolymer.

7. The composition as claimed in claim 1 wherein component (a) has a viscosity of from 2,000,000 to 8,000,000 centistokes at 25°C.

8. The composition as claimed in claim 1 wherein said substituted or unsubstituted monovalent hydrocarbon group represented by symbol R' is selected from the class consisting of methyl, vinyl and phenyl groups.

9. The composition as claimed in claim 1 wherein said component (b) is an organopolysiloxane expressed by the general formula

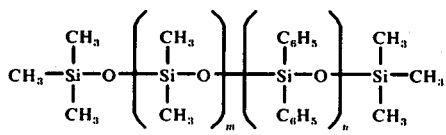

where m is a positive integer equal to or smaller than 30 and n is a positive integer equal to or smaller than 5.

10. The composition as claimed in claim 1 wherein said component (b) is an organopolysiloxane expressed by the general formula

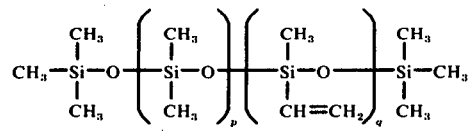

where r is a positive integer equal to or smaller than 40 and s is a positive integer equal to or smaller than 10.

11. The composition as claimed in claim 1 wherein said component (b) is an organopolysiloxane expressed by the general formula

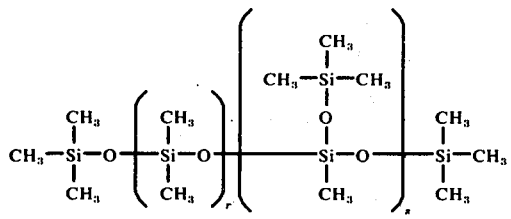

12. The composition as claimed in claim 1 wherein said component (b) is present in an amount of from 5 to 15 parts by weight based on 100 parts by weight of component (a).

13. The composition as claimed in claim 1 wherein said component (c) is silica aerogel having a specific surface area larger than 50 m²/g.

14. A silicone rubber composition consisting essentially of (a) 100 parts by weight of a diorganopolysiloxane having a viscosity of from 2,000,000 to 8,000,000 centistokes at 25° C. represented by the average formula $$R_aSiO_{\frac{4-a}{2}}$$

where R is an organic group, from 60 to 90 mole % of the groups represented by R being methyl groups, from 8 to 40 mole % of same being substituted or unsubstituted monovalent hydrocarbon groups having from 2 to 4 carbon atoms, and from 0 to 7 mole % of same being phenyl groups, and a is a number from 1.98 inclusive to 2.02 inclusive, (b) from 5 to 15 parts by weight of a trimethylsilyl-terminated linear organopolysiloxane having a viscosity of at most 200 centistokes at 25° C, (c) from 20 to 100 parts by weight of silica aerogel having a specific surface area larger than 50 m²/g, and (d) from 0.5 to 5 parts by weight of an organic peroxide.

* * * * *